US012803969B2

(12) United States Patent
Morimoto

(10) Patent No.: US 12,803,969 B2
(45) Date of Patent: Nov. 17, 2026

(54) METHOD FOR INSTALLING ELECTRONIC CERTIFICATE AND SYSTEM FOR INSTALLING ELECTRONIC CERTIFICATE

(71) Applicant: CONTROL SYSTEM LABORATORY Ltd., Kanagawa (JP)

(72) Inventor: Kenichi Morimoto, Kanagawa (JP)

(73) Assignee: CONTROL SYSTEM LABORATORY Ltd., Kanagawa (JP)

(*) Notice: Subject to any disclaimer, the term of this patent is extended or adjusted under 35 U.S.C. 154(b) by 596 days.

(21) Appl. No.: 18/547,789

(22) PCT Filed: Nov. 29, 2022

(86) PCT No.: PCT/JP2022/044055

§ 371 (c)(1),
(2) Date: Aug. 24, 2023

(87) PCT Pub. No.: WO2023/127379

PCT Pub. Date: Jul. 6, 2023

(65) Prior Publication Data

US 2026/0156107 A1 Jun. 4, 2026

(30) Foreign Application Priority Data

Dec. 27, 2021 (JP) ................................ 2021-212404

(51) Int. Cl.
*H04L 9/40* (2022.01)
*G06F 8/61* (2018.01)

(52) U.S. Cl.
CPC ............ *H04L 63/0823* (2013.01); *G06F 8/61* (2013.01)

(58) Field of Classification Search
CPC ............................... H04L 63/0823; G06F 8/61
See application file for complete search history.

(56) References Cited

U.S. PATENT DOCUMENTS 9,172,699 B1 * 10/2015 Vazquez ............. H04L 63/0861
2014/0281555 A1 * 9/2014 Dixon ................. H04L 63/0435 713/176

(Continued)

FOREIGN PATENT DOCUMENTS

CN 113114625 A * 7/2021 ............ H04L 67/06
JP 2005004412 A * 1/2005

(Continued)

OTHER PUBLICATIONS

International Search Report issued in corresponding International Patent Application No. PCT/JP2022/044055 dated Feb. 14, 2023, w/ English Translation.

(Continued)

*Primary Examiner* — J. Brant Murphy
*Assistant Examiner* — Christopher Lam
(74) *Attorney, Agent, or Firm* — Rimon P.C.

(57) ABSTRACT

A method for installing electronic certificates includes: issuing, by a server of a certificate authority, the electronic certificates for authenticating a single terminal in chronological order for each of a plurality of users in a case where the plurality of users use the single terminal at different time points; and when one user of the plurality of users uses the single terminal, using prescribed software which runs on the single terminal to: confirm whether an immediately preceding electronic certificate issued by the server exists on the single terminal; and install a next electronic certificate issued by the server on the single terminal if the immediately preceding electronic certificate exists on the single terminal.

6 Claims, 10 Drawing Sheets

(56) References Cited

U.S. PATENT DOCUMENTS

2018/0062861 A1* 3/2018 Brockhaus .......... H04L 63/0876
2020/0287891 A1* 9/2020 Li ......................... H04L 9/3268

FOREIGN PATENT DOCUMENTS

JP 2015-139104 A 7/2015
WO 2013/003419 A1 1/2013

OTHER PUBLICATIONS

Extended European Search Report dated Aug. 9, 2024, from corresponding European Patent Application No. 22915610.4, 9 pages.

* cited by examiner

METHOD FOR INSTALLING ELECTRONIC CERTIFICATE AND SYSTEM FOR INSTALLING ELECTRONIC CERTIFICATE

CROSS REFERENCE TO RELATED APPLICATIONS

This application is the U.S. National Phase under 35 U.S.C. § 371 of International Application No. PCT/JP2022/044055, filed on Nov. 29, 2022, which claims the benefit of Japanese Application No. 2021-212404, filed on Dec. 27, 2021, and the entire contents of each are hereby incorporated by reference.

TECHNICAL FIELD

The present invention relates to a method and a system for installing an electronic certificate.

BACKGROUND ART

Recently, sites of facilities such as plants and infrastructures require cyber-security measures, and their highest-priority issue is that an inappropriate terminal should not be connected to a network of a facility.

For example, terminals used in an administrative department of a company are personal authentication terminals owned by employees (users), and thus, a terminal can be linked with a user using information such as a password known by the user only. Hence, the personal authentication (login) by the user who owns the terminal is conducted to determine whether the terminal is appropriate. In order to authenticate the terminal, a technique for installing an electronic certificate on the terminal to identify the terminal by two-factor authentication (e.g., authentication using an e-mail address known by the user only and a message code for a cell phone owned by the user) is typically used (e.g., see Patent Literature 1).

CITATION LIST

Patent Literature

Patent Literature 1: WO 2013/003419

SUMMARY OF INVENTION

Technical Problem

In the sites of facilities, on the other hand, there are many terminals which are not directly linked with users, such as a personal computer and an operating panel which are shared by a team. In this situation, it is difficult for a responsible person of a facility to install an electronic certificate on each terminal in the facility. As for a terminal into which dedicated software is introduced such as an operating panel, a supplier and a purchaser of the terminal and an integrator who installs the software on the terminal to be associated with the facility are expected to be different from one another. In this case, not only employees of the facility owner company but also a person outside the company is expected to carry out part of a task on the same terminal. In a case where a plurality of users of a plurality of organizations are involved in a system construction of a single terminal like this, security of the facility cannot be ensured by the conventional technique for installing an electronic certificate on the terminal to identify the terminal using the personal authentication by each user as described above. This may lead to degradation of reliability.

The present invention has been made in view of the foregoing, and an object of the invention is to provide a method and a system for installing electronic certificates on a single terminal without degradation of reliability even in a case where a plurality of users are involved in a system construction of the single terminal.

Solution to Problem

A method for installing electronic certificates according to one aspect of the invention includes: issuing, by a server of a certificate authority, the electronic certificates for authenticating a single terminal in chronological order for each of a plurality of users in a case where the plurality of users use the single terminal at different time points; and when one user of the plurality of users uses the single terminal, using prescribed software which runs on the single terminal to: confirm whether an immediately preceding electronic certificate issued by the server exists on the single terminal; and install a next electronic certificate issued by the server on the single terminal if the immediately preceding electronic certificate exists on the single terminal.

A system for installing electronic certificates according to one aspect of the invention includes a single terminal and a server of a certificate authority. The server is configured to be connected to the single terminal via a network and configured to issue the electronic certificates for authenticating the single terminal in chronological order for each of a plurality of users in a case where the plurality of users use the single terminal at different time points. When one user of the plurality of users uses the single terminal, the single terminal is configured to, by prescribed software: confirm whether an immediately preceding electronic certificate issued by the server exists on the single terminal; and install a next electronic certificate issued by the server on the single terminal if the immediately preceding electronic certificate exists on the single terminal.

Advantageous Effects of Invention

According to the invention, if an immediately preceding electronic certificate issued by a server exists on a terminal, a next electronic certificate is installed on the terminal. With this feature, even in a case where a plurality of users are involved in a system construction of the terminal, it is possible to install the electronic certificates on the terminal without degradation of reliability.

DESCRIPTION OF EMBODIMENTS

A system and methods for installing electronic certificates according to exemplary embodiments of the invention will be described below with reference to the drawings.

In the embodiments, suppose that an authentication system for a network connection using an electronic certificate is introduced to a facility such as a plant. Such an authentication system typically employs an authentication protocol called IEEE 802.1X authentication or RADIUS authentication. The wireless LAN typically employs EAP-TLS authentication. These authentication methods determine whether to permit a connection to a network using an electronic certificate on a terminal rather than an input string of characters such as a pre-public key or a password input by a user.

Figure 1:
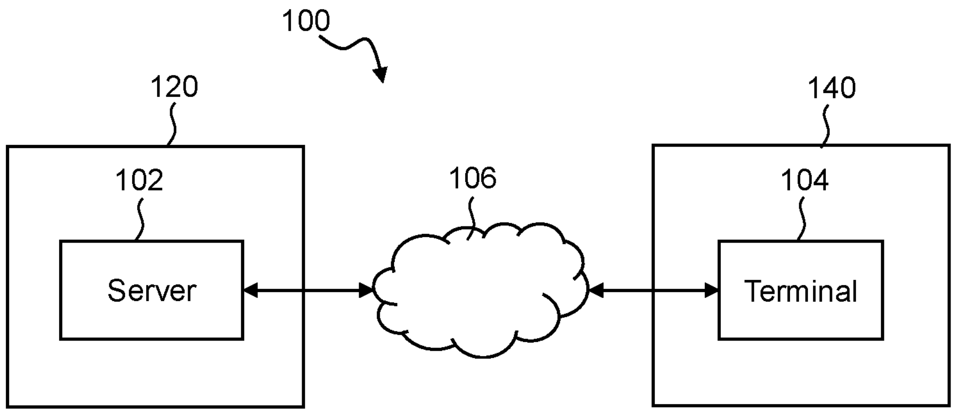
FIG. 1 is a schematic configuration diagram of a system for installing electronic certificates according to embodiments of the invention.
Figure 2:
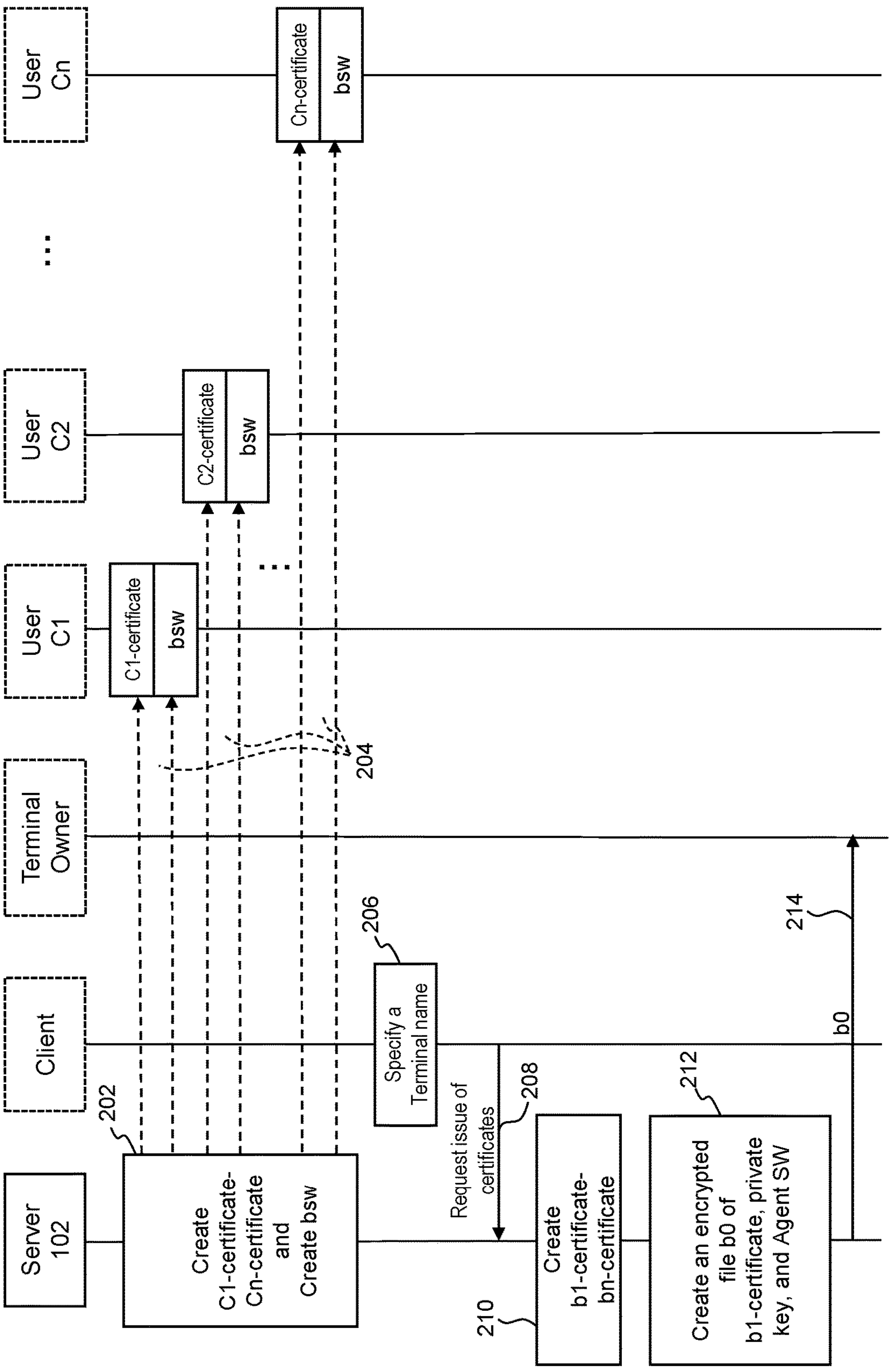
FIG. 2 is a part of a sequence diagram illustrating a method for installing electronic certificates according a first embodiment of the invention.

As shown in FIG. 1, a system 100 for installing electronic certificates includes a server 102 of a certificate authority 120 for issuing electronic certificates, and a terminal 104 located in a facility 140. The server 102 and the terminal 104 are connectable with each other via a network 106 such as the Internet. The word "electronic certificate" may be abbreviated as "certificate" in the following description.

The terminal 104 in the embodiments is a general-purpose computer such as a personal computer in which a plurality of system engineers are frequently involved. However, an embedded dedicated computer such as a control system may be employed as the terminal 104.

In the embodiments, a plurality of users which are involved in adding the single terminal 104 to a system of the facility 140 are denoted by Ci (i=1, . . . , n where n is an integer not less than 2), a certificate to be issued for authenticating the terminal 104 when a user Ci uses the terminal 104 is denoted by bi, and a task carried out by the user Ci on the terminal 104 is denoted by Wi. Examples of the plurality of users Ci include employees of a company of the facility 140 and a person outside the company. Examples of the task Wi include installation of various pieces of software on the terminal 104 and a setup task.

First Embodiment

Next, a method for installing electronic certificates according to the first embodiment will be described with reference to sequence diagrams of FIGS. 2 to 8.

On the server 102 of the certificate authority 120, pieces of information on the plurality of users Ci who carry out the tasks Wi on the terminal 104 (e.g., names, ID codes, and cell phone numbers) and the order i for the user Ci to carry out the task Wi are registered such that they are associated with one another. First, the server 102 creates, for each user, Ci-certificates (user certificates) which are electronic certificates for authenticating the users Ci, and creates software bsw for installing bi-certificates on the terminal 104 (Step 202 of FIG. 2). Each Ci-certificate is stored on a dongle, and the bsw is stored on a storage medium such as a USB memory. Each of the Ci-certificates and the bi-certificates contains a public key. A private key, which is a counterpart to the public key, is stored on the server 102.

A secret string of characters (installation key) for installing each bi-certificate on the terminal 104 is embedded in the bsw.

Upon creation of the Ci-certificates and the bsw, the dongle storing the Ci-certificate and the storage medium storing the bsw are distributed to each user Ci from the certificate authority 120 (Step 204). Note that both the Ci-certificate and the bsw may be stored in a single dongle (or a single storage medium), and only the dongle (or only the storage medium) may be distributed to each user Ci.

Next, a name of the terminal 104 is specified on a computer of a client who intends to request issuance of certificates (Step 206). The specified terminal name and the request for issuance of certificates are then sent to the server 102 via the network 106 (Step 208).

Upon receipt of the request for issuance of certificates, the server 102 creates b1-certificate, b2-certificate, . . . , and bn-certificate which are expected to be installed on the terminal 104 (Step 210). Each bi-certificate has an expiration period denoted by limit(i). The limit(i) is set depending on degree of importance and the order of the task Wi, and other such factors. Specifically, the bn-certificate which is the final issuance has the longest expiration period (limit (n)). For example, the b1-certificate may have the expiration period of 90 days (limit(1)), the b2-certificate to b(n−1)-certificate may have the expiration period of 30 days (limit (2) to limit(n−1)), and the bn-certificate may have the expiration period of 10 years (limit(n)).

Subsequently, the server 102 creates an encrypted file b0 of the b1-certificate, its private key, the specified terminal name, and Agent software (Step 212), and sends the file b0 to the owner's terminal 104 via the network 106 (Step 214). Here, the Agent software is software for external reporting about terminal information indicating a status of the terminal 104. The terminal information contains individual identification information and setup information of the terminal 104, such as serial number, a Media Access Control (MAC) address, a list of installed applications, a version of an operating system (OS), and update time.

Figure 3:
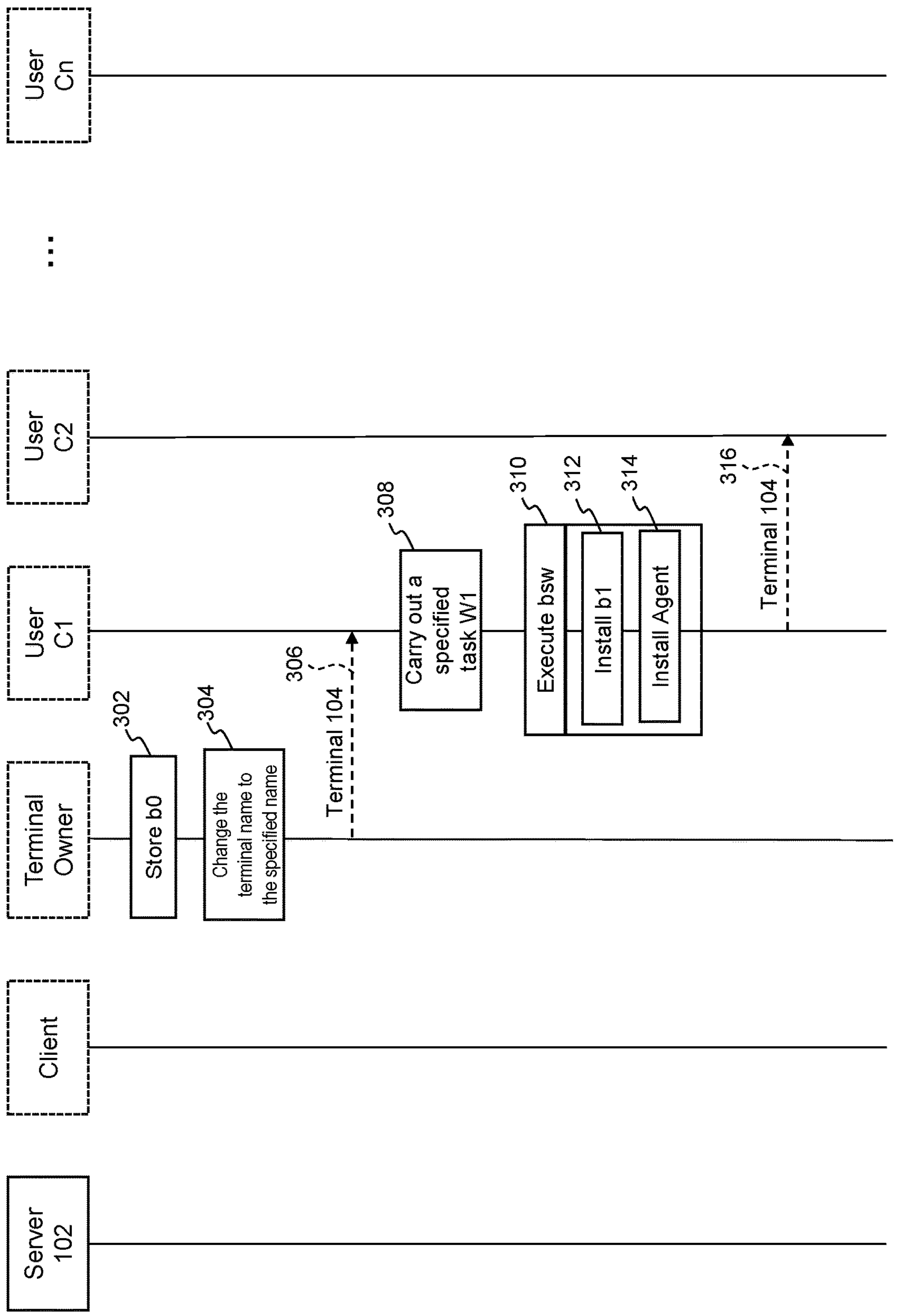
FIG. 3 is a part of the sequence diagram illustrating the method for installing electronic certificates according the first embodiment.

The file b0 is stored on the terminal 104 (Step 302 of FIG. 3). A name of the terminal 104 is then changed to the specified name (Step 304). After that, the terminal 104 is provided to a first user C1 from the terminal owner (Step 306).

The user C1 connects the dongle received at Step 204 to the terminal 104, and carries out a specified task W1 on the terminal 104 (Step 308). After that, the user C1 connects the storage medium received at Step 204 to the terminal 104, which activates the bsw stored on the storage medium (Step 310). In step 310, the b1-certificate included in the file b0 is installed on the terminal 104 (Step 312), and the Agent software is installed on the terminal 104 (Step 314). The b1-certificate is stored on a predetermined storage area in the terminal 104. After completion of execution of the bsw, the terminal 104 is provided to the next user C2 (Step 316).

Note that the terminal 104 may be provided to the user C1 in advance so that Steps 302 and 304 can be executed on the user C1 side.

Figure 4:
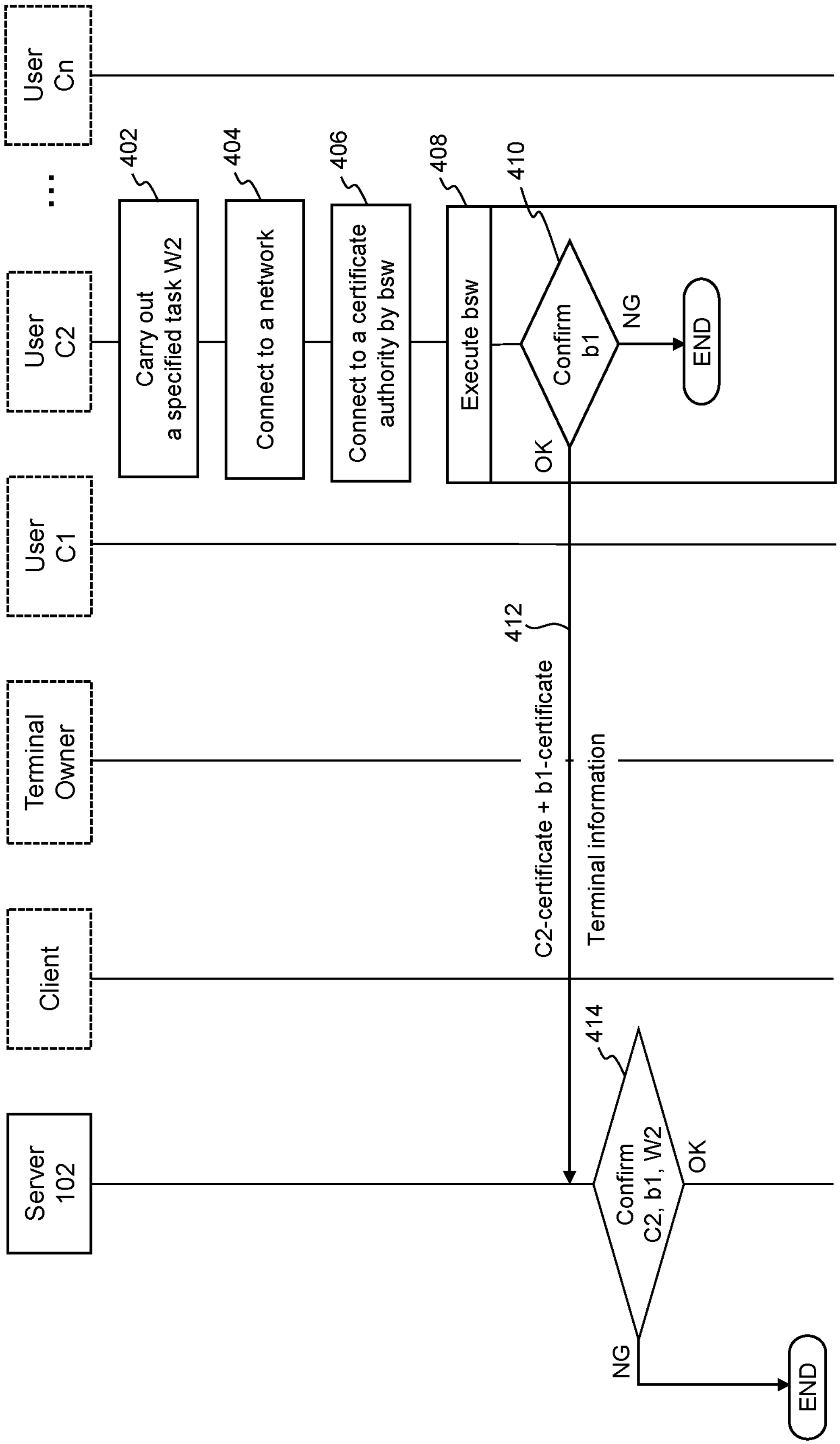
FIG. 4 is a part of the sequence diagram illustrating the method for installing electronic certificates according the first embodiment.

The user C2 connects the dongle received at Step 204 to the terminal 104, and carries out a specified task W2 on the terminal 104 (Step 402 of FIG. 4). The user C2 then connects the terminal 104 to the network 106 (Step 404). After that, the user C2 connects the storage medium received at Step 204 to the terminal 104. This activates the bsw stored on the storage medium, allowing the terminal 104 to be connected to the server 102 of the certificate authority 120 via the network 106 (Step 406) and to start the execution of the bsw (Step 408).

In Step 408, first, the terminal 104 confirms whether the b1-certificate which is an immediately preceding certificate exists on the terminal 104 and confirms whether the b1-certificate is within the expiration period (limit(1)) (Step 410). If the b1-certificate within the expiration period does not exist (Step 410: NG), the bsw ends. On the other hand, if the b1-certificate within the expiration period exists on the terminal 104 (Step 410: OK), the terminal 104 sends information on the C2-certificate and information on the b1-certificate to the server 102 via the network 106, and runs the Agent software to send terminal information indicating the current status of the terminal 104 (individual identification information and setup information) to the server 102 via the network 106 (Step 412). For example, the information on the C2-certificate and the information on the b1-certificate, which are sent to the server 102, may include public keys contained in these certificates, and may contain certificates of the certificate authority 120 which issues C2- and b1-certificates, i.e., the public keys of the certificate authority 120.

Note that, at Step 412, private keys of the C2-certificate and the b1-certificate may be sent to the server 102. In this case, the private keys need to be sent after encrypted.

The server 102 confirms the public keys of a root certificate and an intermediate certificate of the certificate authority 120, which are contained in the received C2-certificate, using the private key owned by the server 102, or confirms the C2-certificate using the private key which is sent in encrypted form and is a counterpart to the public key of the C2-certificate. The server 102 further confirms the public keys of the root certificate and the intermediate certificate of the certificate authority 120, which are contained in the received b1-certificate, using the private key owned by the server 102, or confirms the b1-certificate using the private key which is sent in encrypted form and is a counterpart to the public key of the b1-certificate. The server 102 further confirms whether the task W2 is carried out properly on the terminal 104, based on the received terminal information (Step 414).

If the server 102 cannot confirm at least one of the C2-certificate, the b1-certificate, and the task W2 (Step 414: NG), the server 102 notifies the terminal 104 of it and ends the process. In this case, the b2-certificate will not be installed on the terminal 104.

On the other hand, if the server 102 can successfully confirm all of the C2-certificate, the b1-certificate, and the task W2 (Step 414: OK), the server 102 encrypts the b2-certificate and its private key (Step 502 of FIG. 5), and sends the encrypted file to the terminal 104 via the network 106 (Step 504).

The terminal 104, which is executing the bsw, installs the b2-certificate which is downloaded from the server 102 (Step 506). The b2-certificate is stored on a predetermined storage area in the terminal 104. Subsequently, the terminal 104 runs the Agent software (Step 508) to send terminal information indicating the current status of the terminal 104 (i.e., the above-described individual identification information and setup information) to the server 102 via the network 106 (Step 510).

The server 102 registers the received terminal information (Step 512) and registers completion of installation of the b2-certificate (Step 514). After that, the server 102 deletes the b2-certificate (Step 516).

After completion of installation of the b2-certificate on the terminal 104, the terminal 104 is provided to the next user C3 (Step 518).

Figure 5:
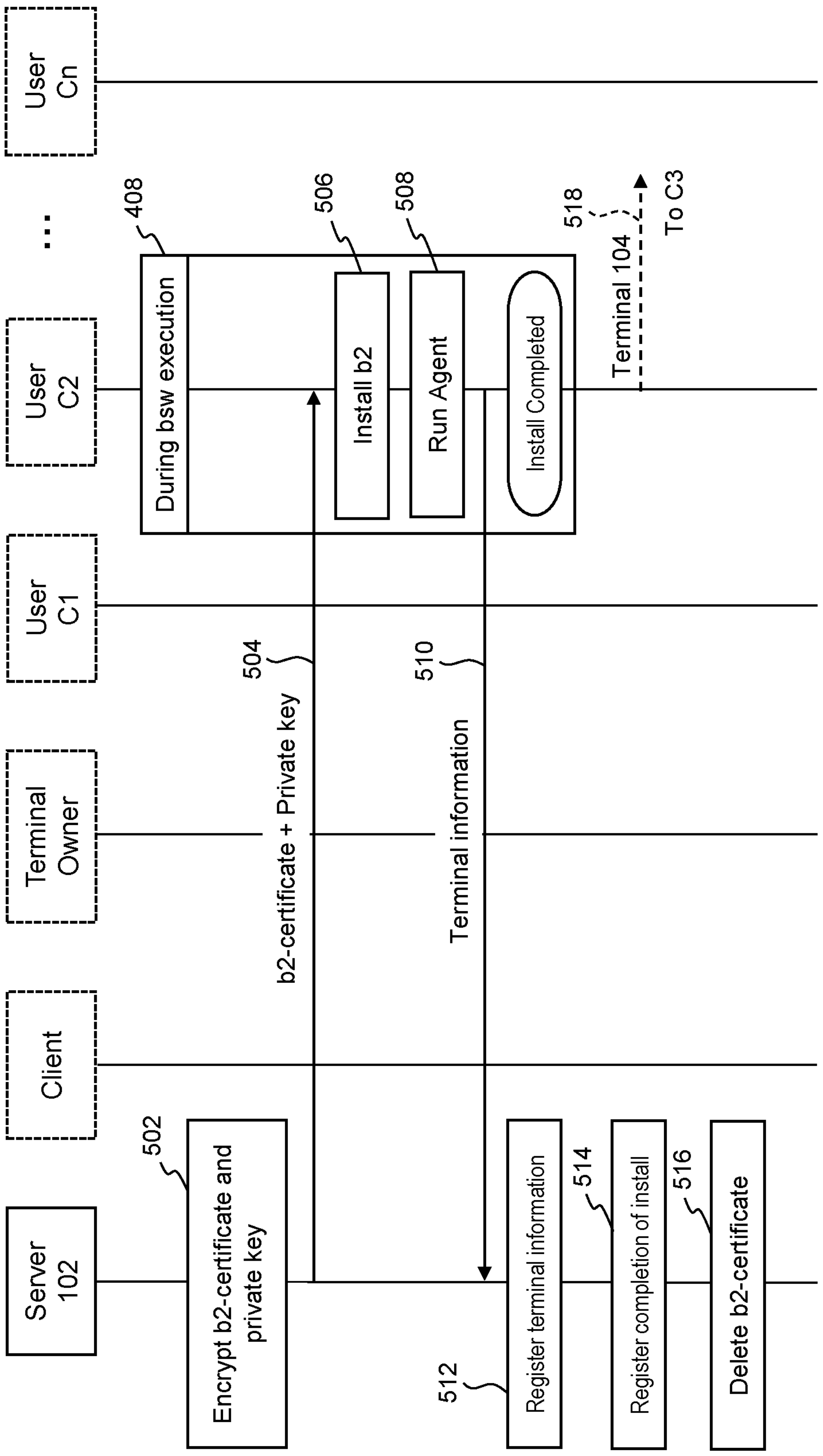
FIG. 5 is a part of the sequence diagram illustrating the method for installing electronic certificates according the first embodiment.

Next, a process executed when the third to (n−1)-th users Ci (i=3, 4, . . . , n−1) use the terminal 104 will be described with reference to FIGS. 6 and 7, focusing only on different steps from those in FIGS. 4 and 5. The client who requested issuance of certificates is not shown in FIG. 6 and the subsequent figures.

Figure 6:
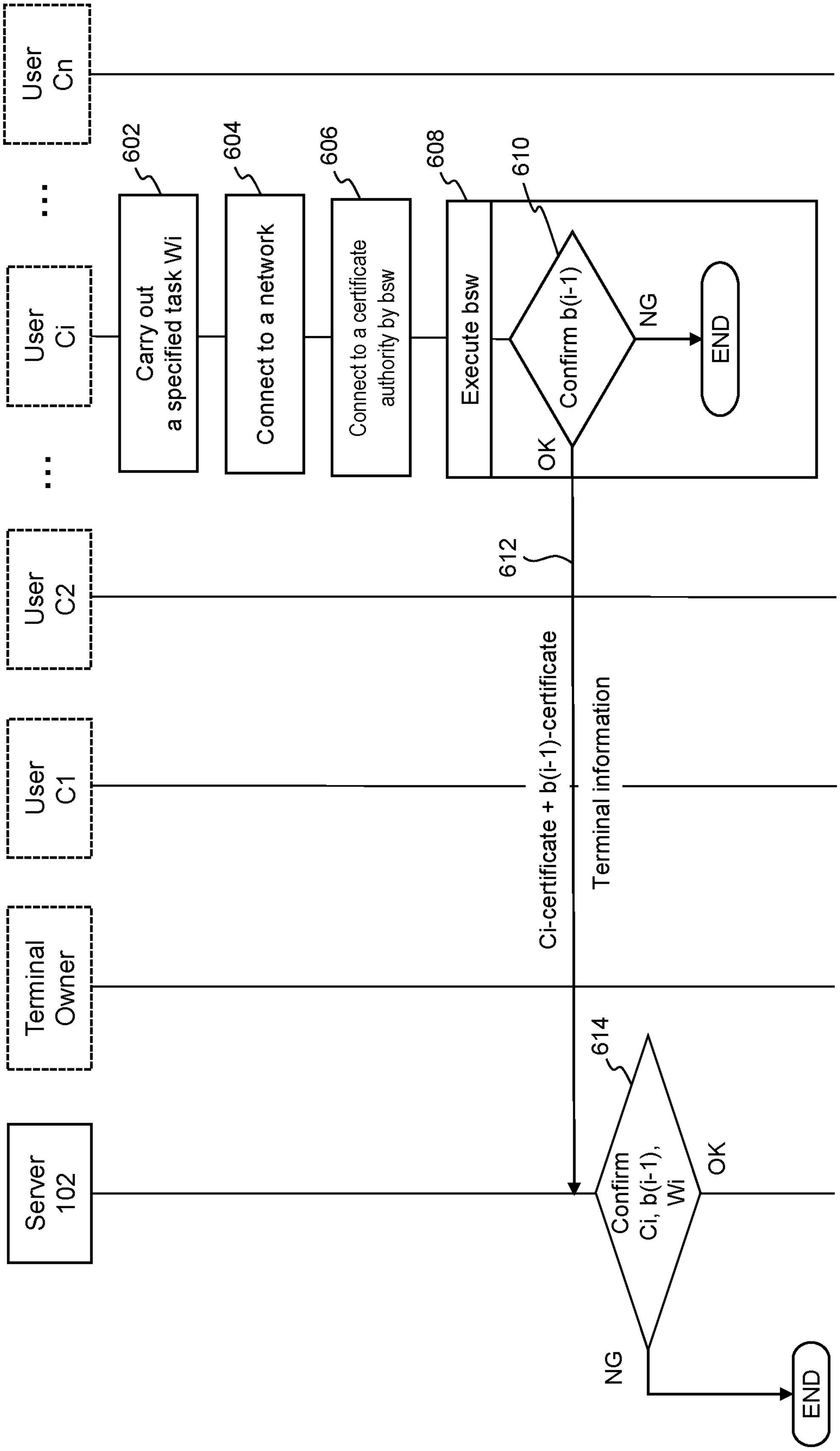
FIG. 6 is a part of the sequence diagram illustrating the method for installing electronic certificates according the first embodiment.

Steps 602 to 614 of FIG. 6 are identical to Steps 402 to 414 of FIG. 4, respectively except that W2, b1, and C2 shown in FIG. 4 are replaced with Wi, b(i−1), and Ci, respectively. Steps 702 to 710 of FIG. 7 are identical to Steps 502 to 510 of FIG. 5, respectively except that b2 shown in FIG. 5 is replaced with bi. Step 712 of FIG. 7 and the subsequent steps will now be described below.

The server 102 compares the terminal information of the terminal 104 received at Step 710 with the terminal information registered in the server 102 (Step 712). If the server 102 determines from the comparison result at Step 712 that they are not the same terminal (Step 712: NG), the server 102 notifies the terminal 104 that the terminal 104 is an inappropriate terminal, and ends the process. On the other hand, if the server 102 determines at Step 712 that they are the same terminal (Step 712: OK), the server 102 registers the terminal information received at Step 710, registers completion of installation of the bi-certificate (Step 714), and deletes the bi-certificate (Step 716).

After completion of installation of the bi-certificate on the terminal 104, the terminal 104 is provided to the next user C(i+1) (Step 718). Note that if the terminal 104 used by the user Ci is determined to be an inappropriate terminal (Step 712: NG), the next b(i+1)-certificate will not be installed on the terminal 104 even when the terminal 104 is provided to the next user C(i+1).

Figure 7:
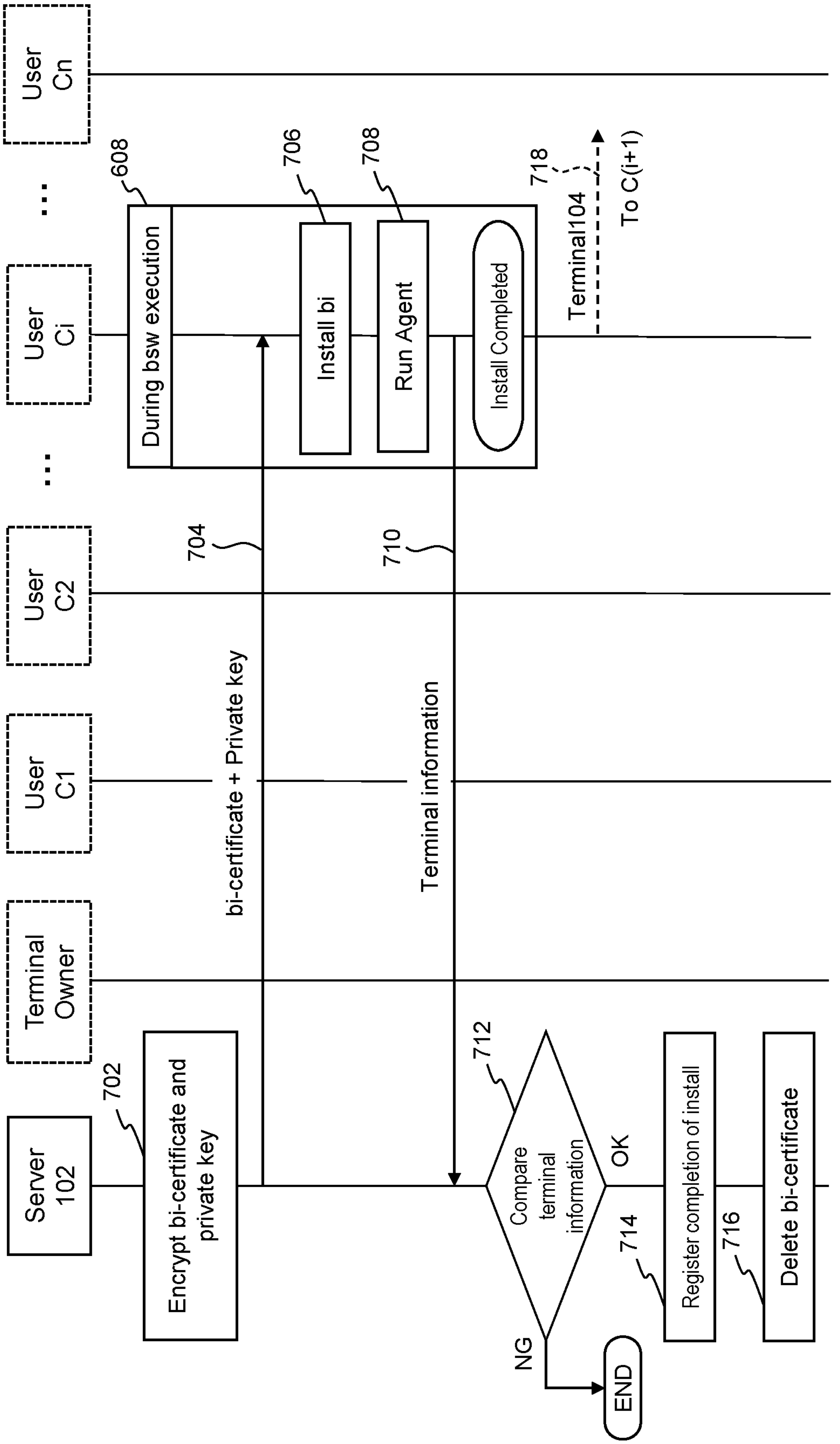
FIG. 7 is a part of the sequence diagram illustrating the method for installing electronic certificates according the first embodiment.

A process executed when the last user Cn uses the terminal 104 is identical to a process when i=n in FIGS. 6 and 7 except that the terminal 104 is returned to the owner after completion of installation of the bn-certificate.

After the terminal 104 is returned to the owner from the user Cn (Step 802 of FIG. 8), the terminal 104 is connected to the server 102 by the owner's operation to request the server 102 to send a history of the terminal information of the terminal 104 and a history 41 installation (Step 804) in order to confirm whether the terminal 104 is an appropriate terminal. Upon receipt of the history of the terminal information and the history of installation from the server 102 via the network 106 (Step 806), the terminal 104 compares the received data of histories with data of histories stored in the terminal 104 (Step 808), and sends the comparison result to the server 102 via the network 106 (Step 810).

If the histories registered in the server 102 match the histories stored in the terminal 104 (Step 812: YES), and ends the process. On the other hand, if there is a mismatch between the histories (Step 812: NO), the server 102 invalidates the information on the Ci-certificate, the information on the bi-certificate, the history of the terminal information, the history of installation, and all the other related data (Step 814), and ends the process.

If the mismatch between the histories is confirmed, the terminal 104 determines that this terminal is inappropriate, and initializes the related data stored in the terminal 104 (such as the information on the Ci-certificate, the information on the bi-certificate, the history of the terminal information, and the history of installation) (Step 816). On the other hand, if the match between the histories is confirmed, the terminal 104 ends the process (Step 816).

According to the first embodiment described above, in a case where the plurality of users Ci use the single terminal 104 at different time points, the bsw which runs on the terminal 104 does not allow a next bi-certificate to be installed on the terminal 104 unless the immediately preceding b(i−1)-certificate exists on the terminal 104. The server 102 issues the next bi-certificate after personal authentication for the user Ci who uses the terminal 104 and authentication for the terminal 104 are successful based on the information on the Ci-certificate and the information on the immediately preceding b(i−1)-certificate. That is, the b1-certificate, the b2-certificate, . . . , and the bn-certificate are installed on the single terminal 104 such that they are connected in chronological order like a chain. Hence, an inappropriate terminal will not be connected to a network of the facility 140 unless all the users C1, C2, . . . , and Cn collude with one another. Therefore, even in a case where the plurality of users Ci are involved in a system construction of the single terminal 104, it is possible to install the electronic certificates on the terminal 104 without degradation of reliability.

Moreover, each bi-certificate has the expiration period (limit(i)). Therefore, even if a user Ci makes an unauthorized copy of the bi-certificate, the copied bi-certificate is valid within the expiration period, which reduces a risk of security. Furthermore, the server 102 issues the bi-certificate after confirming that the task Wi is carried out properly on the terminal 104. This makes it possible to ensure that the tasks Wi are carried out properly in a predetermined order by the plurality of users Ci.

In addition, after a user Ci carries out a specified task Wi on the terminal 104 and the bi-certificate is installed on the terminal 104, the Agent software causes the terminal information indicating the status of the terminal 104 (individual identification information and setup information) to be reported to the server 102, and the server 102 registers the terminal information. Hence, setup procedures on the single terminal 104 are traceable, and thus even if inappropriate software or data are installed on the terminal 104, it is possible to specify the user who does such a thing.

In the above example, all users Ci use the same software bsw as software for installing the electronic certificates, and the Ci-certificate is stored on a dongle which is distributed to each user. Alternatively, each user Ci may use software bswi of his/her own in which the Ci-certificate for the user is embedded. In this case, the above-described dongle is not required.

Second Embodiment

In the above-described first embodiment, after a user Ci carries out a specified task Wi on the terminal 104, the personal authentication for the user Ci and the authentication for the terminal 104 are conducted, and a bi-certificate is then installed on the terminal 104. In the second embodiment, the personal authentication and the terminal authentication are conducted not only after the specified task Wi but also before the specified task Wi.

Figure 9:
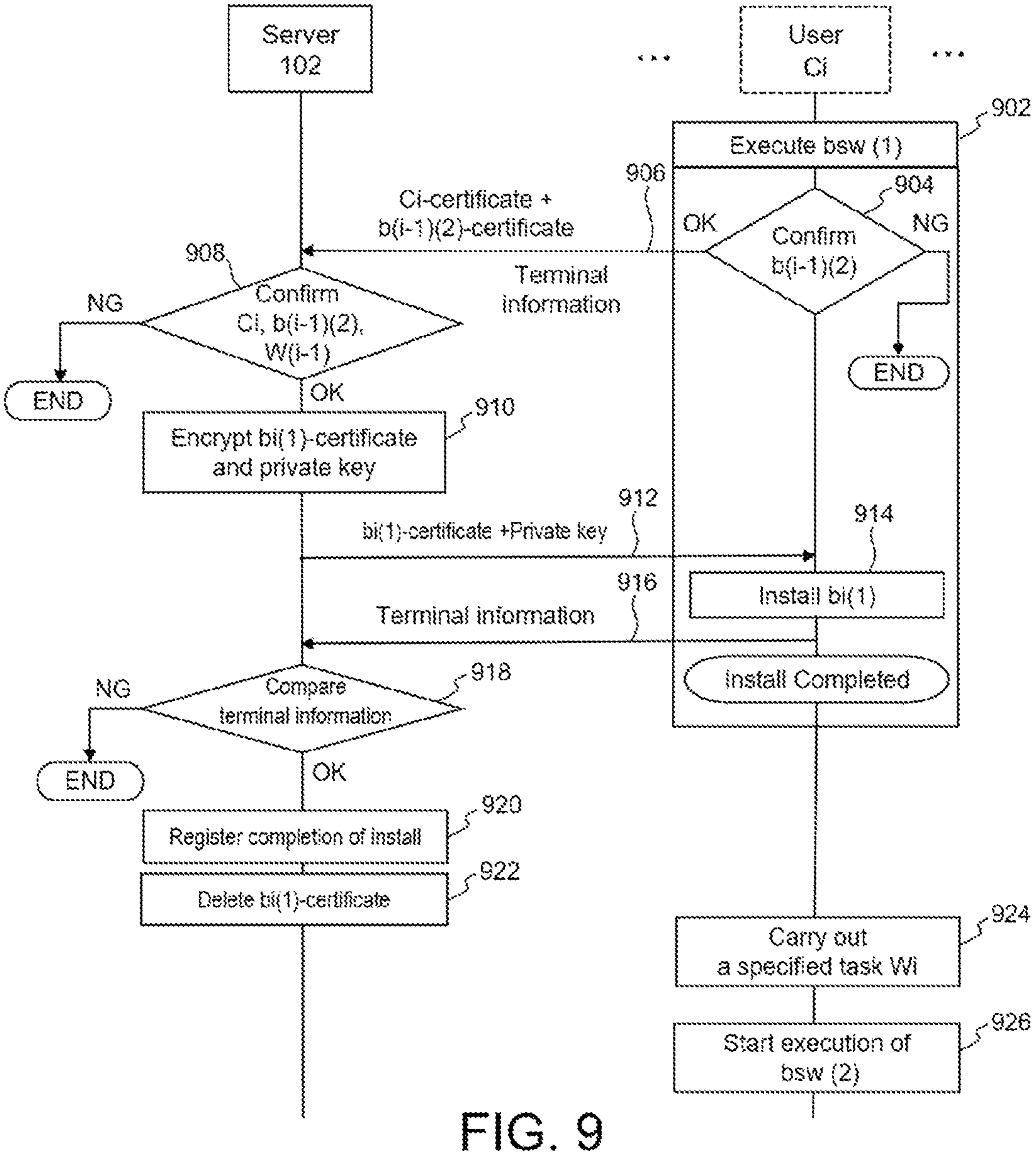
FIG. 9 is a part of a sequence diagram illustrating a method for installing electronic certificates according a second embodiment of the invention.
Figure 10:
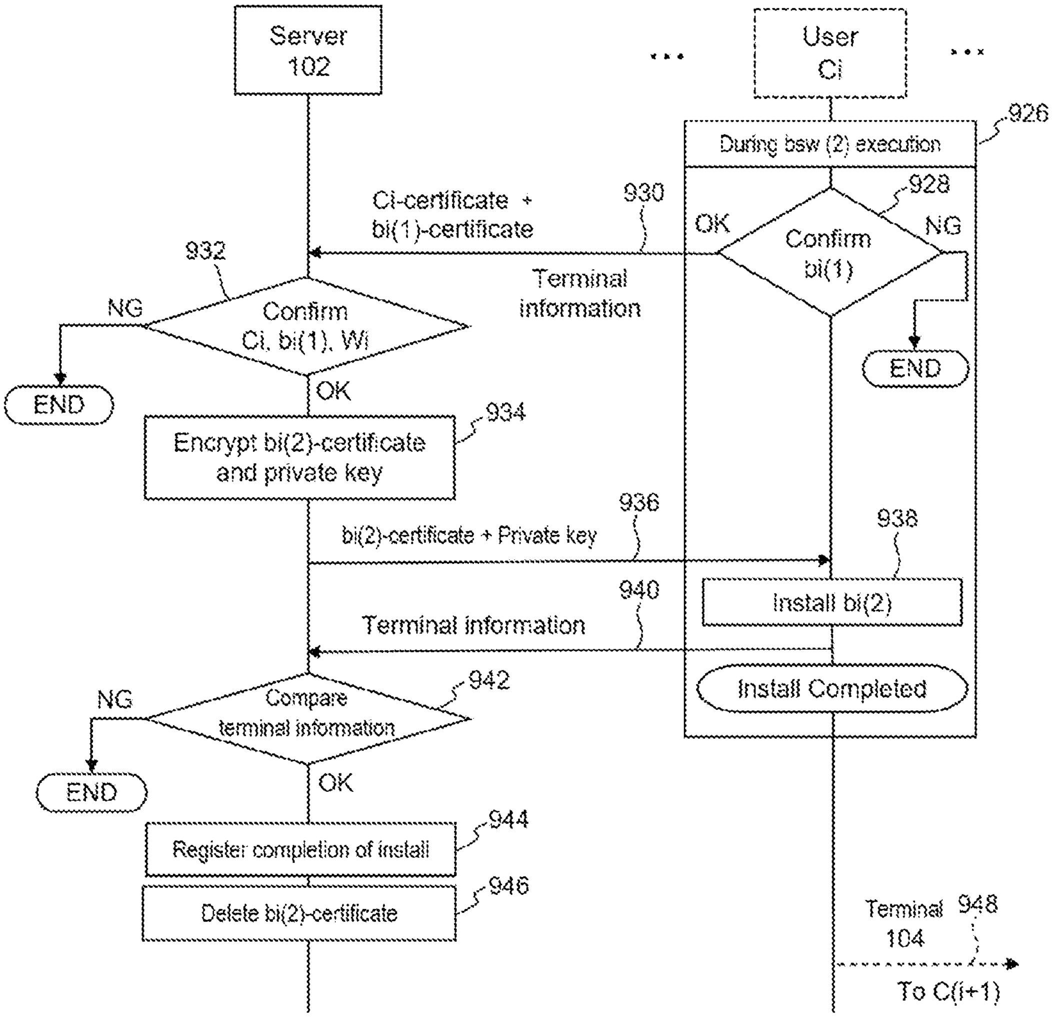
FIG. 10 is a part of the sequence diagram illustrating the method for installing electronic certificates according the second embodiment of the invention.

A method for installing electronic certificates according to the second embodiment will be described with reference to FIGS. 9 and 10.

In the following example, an electronic certificate to be installed immediately before a task Wi will be denoted by bi(1), an electronic certificate to be installed immediately after the task Wi will be denoted by bi(2), software for installing the bi(1)-certificate will be denoted by bsw(1), and software for installing the bi(2)-certificate will be denoted by bsw(2). Installation keys for installing the bi(1)-certificate and the bi(2)-certificate on the terminal 104 are embedded in the bsw(1) and the bsw(2), respectively.

A user Ci connects a dongle received in advance and storing a Ci-certificate and a storage medium storing the bsw(1), to the terminal 104. This activates the bsw(1) (Step 902 of FIG. 9). In Step 902, first, the terminal 104 confirms whether a b(i−1) (2)-certificate which is an immediately preceding certificate exists on the terminal 104 and confirms whether the b(i−1) (2)-certificate is within an expiration period (Step 904).

If the b(i−1) (2)-certificate within the expiration period does not exist on the terminal 104 (Step 904: NG), the bsw (1) ends. On the other hand, if the b(i-1) (2)-certificate within the expiration period exists on the terminal 104 (Step 904: OK), the terminal 104 sends information on the Ci-certificate and information on the b(i-1) (2)-certificate to the server 102 via the network 106, and runs the Agent software to send terminal information indicating the current status of the terminal 104 (individual identification information and setup information) to the server 102 via the network 106 (Step 906). For example, the information on the Ci-certificate and the information on the b(i−1) (2)-certificate, which are sent to the server 102, may include public keys contained in these certificates, and may contain certificates of the certificate authority 120 which issues the Ci- and b(i−1) (2)-certificates, i.e., the public keys of the certificate authority 120.

Note that, at Step 906, private keys of the Ci-certificate and the b(i−1) (2)-certificate may be sent to the server 102. In this case, the private keys need to be sent after encrypted.

The server 102 confirms the public keys of a root certificate and an intermediate certificate of the certificate authority 120, which are contained in the received Ci-certificate, using the private key owned by the server 102, or confirms the Ci-certificate using the private key which is sent in encrypted form and is a counterpart to the public key of the Ci-certificate. The server 102 further confirms the public keys of the root certificate and the intermediate certificate of the certificate authority 120, which are contained in the received b(i−1) (2)-certificate, using the private key owned by the server 102, or confirms the b(i−1) (2)-certificate using the private key which is sent in encrypted form and is a counterpart to the public key of the b(i−1) (2)-certificate. The server 102 further confirms whether a task W(i−1) is carried out properly on the terminal 104, based on the received terminal information (Step 908).

If the server 102 cannot confirm at least one of the Ci-certificate, the b(i−1) (2)-certificate, and the task W(i−1) (Step 908: NG), the server 102 notifies the terminal 104 of it and ends the process. In this case, a bi(1)-certificate will not be installed on the terminal 104.

On the other hand, if the server 102 can successfully confirm all of the Ci-certificate, the b(i−1) (2)-certificate, and the task W(i−1) (Step 908: OK), the server 102 encrypts the bi (1)-certificate and its private key (Step 910), and sends the encrypted file to the terminal 104 via the network 106 (Step 912).

The terminal 104, which is executing the bsw(1), installs the bi(1)-certificate which is downloaded from the server 102 (Step 914). The bi(1)-certificate is stored on a predetermined storage area in the terminal 104. Subsequently, the terminal 104 runs the Agent software to send terminal information indicating the current status of the terminal 104 (i.e., individual identification information and setup information) to the server 102 via the network 106 (Step 916).

The server 102 compares the terminal information of the terminal 104 received at Step 916 with the terminal information registered in the server 102 (Step 918). If the server 102 determines from the comparison result at Step 918 that they are not the same terminal (Step 918: NG), the server 102 notifies the terminal 104 that the terminal 104 is an inappropriate terminal, and ends the process. On the other hand, if the server 102 determines at Step 918 that they are the same terminal (Step 918: OK), the server 102 registers the terminal information received at Step 916, registers completion of installation of the bi(1)-certificate (Step 920), and deletes the bi(1)-certificate (Step 922).

After completion of installation of the bi(1)-certificate on the terminal 104 and completion of execution of the bsw(1), the user Ci carries out a specified task Wi on the terminal 104 (Step 924). After completion of the specified task Wi, execution of the bsw(2) starts (Step 926). In step 926, first, the terminal 104 confirms whether the bi(1)-certificate which is an immediately preceding certificate exists on the terminal 104 and confirms whether the bi(1)-certificate is within an expiration period (Step 928 of FIG. 10).

If the bi(1)-certificate within the expiration period does not exist on the terminal 104 (Step 928: NG), the bsw(2) ends. On the other hand, if the bi(1)-certificate within the expiration period exists on the terminal 104 (Step 928: OK), the terminal 104 sends information on the Ci-certificate and information on the bi(1)-certificate to the server 102 via the network 106, and runs the Agent software to send terminal information indicating the current status of the terminal 104 (individual identification information and setup information) to the server 102 via the network 106 (Step 930). For example, the information on the Ci-certificate and the information on the bi(1)-certificate, which are sent to the server 102, may include public keys contained in these certificates, and may contain certificates of the certificate authority 120 which issues the Ci- and bi(1)-certificates, i.e., the public keys of the certificate authority 120.

Note that, at Step 930, private keys of the Ci-certificate and the bi(1)-certificate may be sent to the server 102. In this case, the private keys need to be sent after encrypted.

The server 102 confirms the public keys of a root certificate and an intermediate certificate of the certificate authority 120, which are contained in the received Ci-certificate, using the private key owned by the server 102, or confirms the Ci-certificate using the private key which is sent in encrypted form and is a counterpart to the public key of the Ci-certificate. The server 102 further confirms the public keys of the root certificate and the intermediate certificate of the certificate authority 120, which are contained in the received bi(1)-certificate, using the private key owned by the server 102, or confirms the bi(1)-certificate using the private key which is sent in encrypted form and is a counterpart to the public key of the bi(1)-certificate. The server 102 further confirms whether the task Wi is carried out properly on the terminal 104, based on the received terminal information (Step 932).

If the server 102 cannot confirm at least one of the Ci-certificate, the bi(1)-certificate, and the task Wi (Step 932: NG), the server 102 notifies the terminal 104 of it and ends the process. In this case, a bi(2)-certificate will not be installed on the terminal 104.

On the other hand, if the server 102 can successfully confirm all of the Ci-certificate, the bi(1)-certificate, and the task Wi (Step 932: OK), the server 102 encrypts the bi(2)-certificate and its private key (Step 934), and sends the encrypted file to the terminal 104 via the network 106 (Step 936).

The terminal 104, which is executing the bsw(2), installs the bi(2)-certificate which is downloaded from the server 102 (Step 938). The bi(2)-certificate is stored on a predetermined storage area in the terminal 104. Subsequently, the terminal 104 runs the Agent software to send terminal information indicating the current status of the terminal 104 (i.e., individual identification information and setup information) to the server 102 via the network 106 (Step 940).

The server 102 compares the terminal information of the terminal 104 received at Step 940 with the terminal information registered in the server 102 (Step 942). If the server 102 determines from the comparison result at Step 942 that they are not the same terminal (Step 942: NG), the server 102 notifies the terminal 104 that the terminal 104 is an inappropriate terminal, and ends the process. On the other hand, if the server 102 determines at Step 942 that they are the same terminal (Step 942: OK), the server 102 registers the terminal information received at Step 940, registers completion of installation of the bi(2)-certificate (Step 944), and deletes the bi(2)-certificate (Step 946).

After completion of installation of the bi(2)-certificate on the terminal 104, the terminal 104 is provided to the next user C(i+1) (Step 948). Note that if the terminal 104 used by the user Ci is determined to be an inappropriate terminal (Step 942: NG), the next electronic certificate will not be installed on the terminal 104 even when the terminal 104 is provided to the next user C(i+1).

Figure 8:
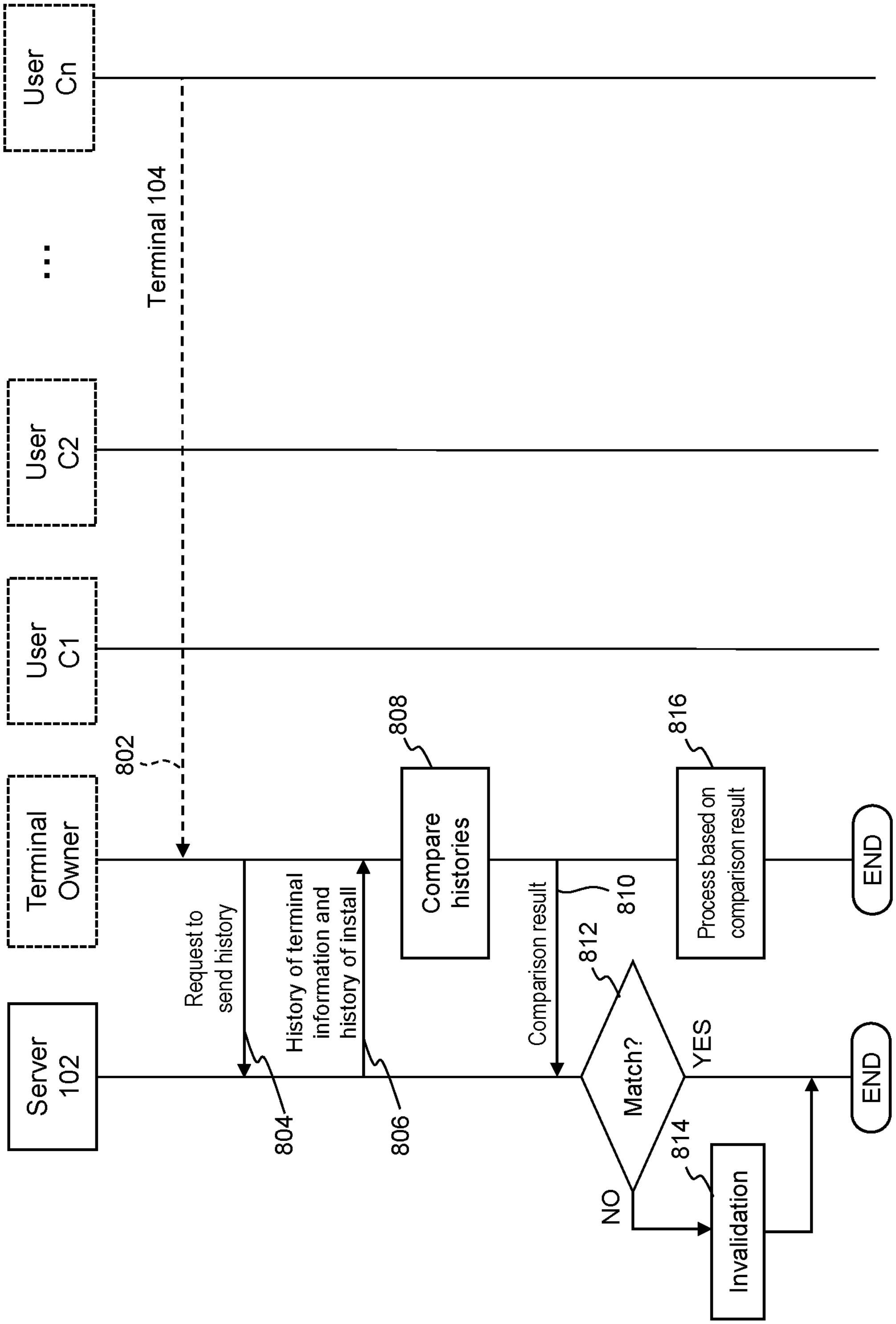
FIG. 8 is a part of the sequence diagram illustrating the method for installing electronic certificates according the first embodiment.

After the last user Cn installs a bn(2)-certificate on the terminal 104, the process shown in FIG. 8 will be executed.

According to the second embodiment described above, before and after the specified task Wi, the software bsw(1) and bsw(2) cause the bi(1)-certificate and the bi(2)-certificate to be installed on the terminal 104, respectively. This makes it possible to further enhance security of the facility 140.

The invention is not limited to the above-described embodiments, and various modifications can be made without departing from the scope of the invention. Other embodiments and variations made by those skilled in the art are intended to be embraced within the scope of the invention.

For example, although only the Ci-certificate which is an electronic certificate is employed to identify the user Ci who uses the terminal 104 in the above embodiments, multi-factor authentication may be employed. For example, the server 102 sends a one-time password via a short message service (SMS) to a cell phone owned by the user Ci, and the one-time password is input to the terminal 104 and sent back to the server 102. Thus, it is possible to conduct two-factor authentication using the user Ci's cell phone and the terminal 104.

REFERENCE SIGNS LIST

100: System for installing electronic certificates
102: Server
104: Terminal
106: Network
120: Certificate authority
140: Facility

The invention claimed is:

1. A method for installing electronic certificates, comprising:

issuing, by a server of a certificate authority, the electronic certificates for authenticating a single terminal in chronological order for each of a plurality of users in a case where the plurality of users use the single terminal at different time points; and when one user of the plurality of users uses the single terminal, using prescribed software which runs on the single terminal to:

confirm whether an immediately preceding electronic certificate issued by the server for another user who previously used the single terminal exists on the single terminal; and install a next electronic certificate issued by the server for the one user of the plurality of users on the single terminal in response to the immediately preceding electronic certificate issued for the another user existing on the single terminal.

2. The method according to claim 1, further comprising:

issuing, by the server, user certificates for personal authentication for each of the plurality of users;

sending information on a user certificate of the one user and information on the immediately preceding electronic certificate, from the single terminal to the server via a network if the immediately preceding electronic certificate exists on the single terminal; and sending the next electronic certificate from the server to the single terminal via the network if the personal authentication for the one user and authentication for the single terminal are successful by the server based on the information on the user certificate and the information on the immediately preceding electronic certificate which are received from the single terminal.

3. The method according to claim 1, wherein each of the electronic certificates issued by the server has an expiration period.

4. The method according to claim 1, further comprising:

after installing the next electronic certificate on the single terminal, sending terminal information including individual identification information and setup information of the single terminal, from the single terminal to the server via a network; and registering, by the server, the terminal information received from the single terminal.

5. The method according to claim 1, further comprising:

identifying, by the server, each of the plurality of users who use the single terminal by multi-factor authentication.

6. A system for installing electronic certificates, comprising:

a single terminal; and a server of a certificate authority, the server being configured to be connected to the single terminal via a network and configured to issue the electronic certificates for authenticating the single terminal in chronological order for each of a plurality of users in a case where the plurality of users use the single terminal at different time points, wherein when one user of the plurality of users uses the single terminal, the single terminal is configured to, by prescribed software:

confirm whether an immediately preceding electronic certificate issued by the server for another user who previously used the single terminal exists on the single terminal; and install a next electronic certificate issued by the server for the one user of the plurality of users on the single terminal if the immediately preceding electronic certificate issued for the another user exists on the single terminal.

* * * * *